United States Patent Office 3,438,647
Patented Apr. 15, 1969

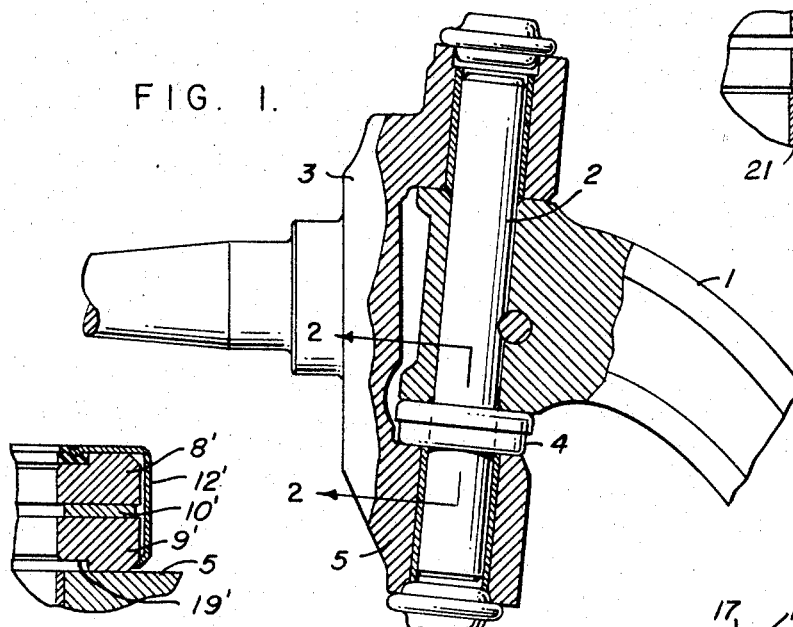
FIG. 1.
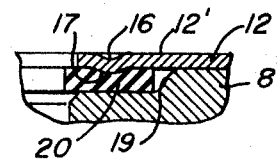
FIG. 2c.
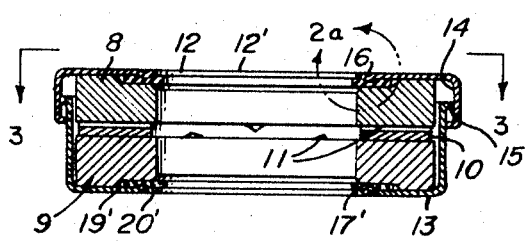
FIG. 2b.
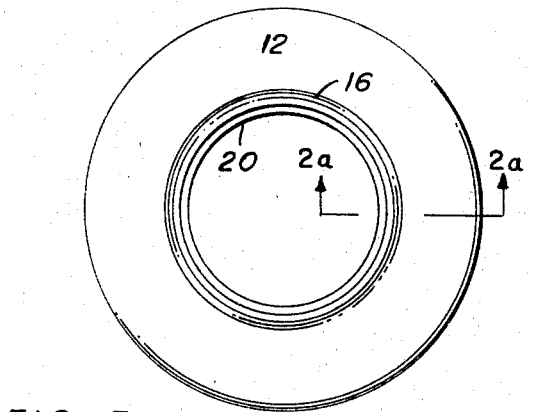
FIG. 2a.
FIG. 2.
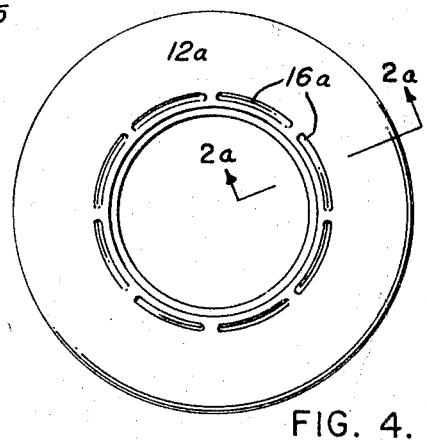
FIG. 4.
FIG. 3.
INVENTORS.
HENRY J. FRABONI
HAROLD C. MAPES
NEWELL D. MULLIN
BY 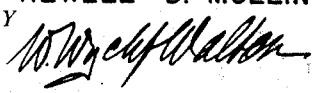
ATTORNEY.

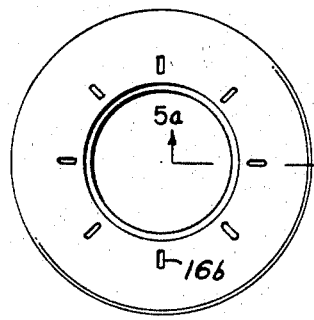
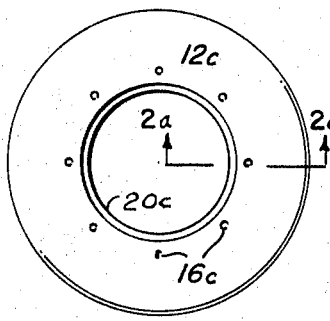
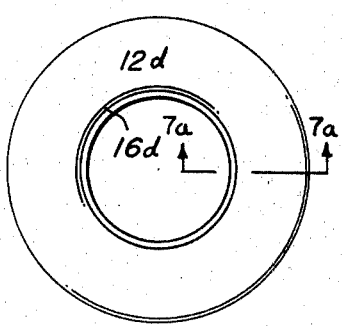
FIG. 5.  FIG. 6.  FIG. 7.
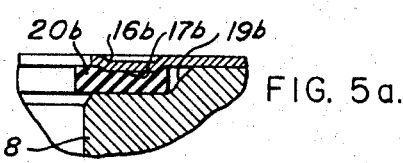
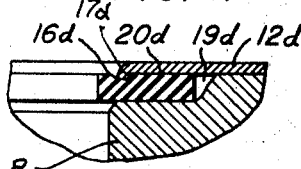
FIG. 5a.  FIG. 7a.
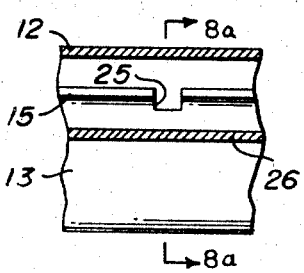
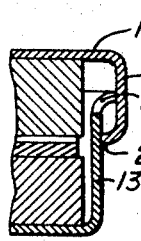
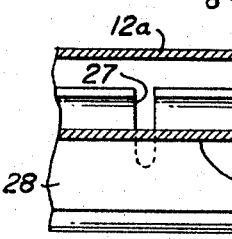
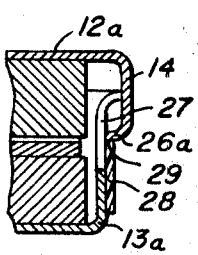
FIG. 8.  FIG. 8a.  FIG. 9.  FIG. 9a.
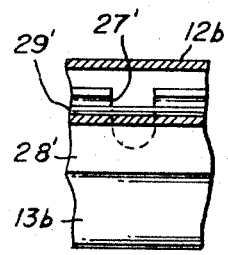
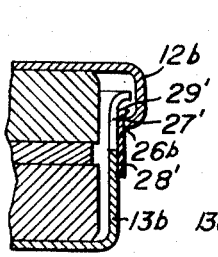
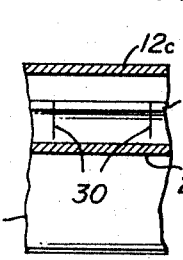
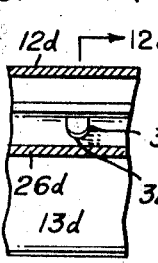
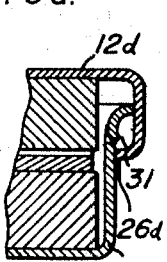
FIG. 10.  FIG. 10a.  FIG. 11.  FIG. 12.  FIG. 12a.
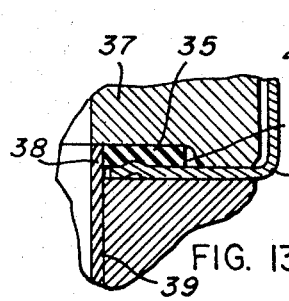
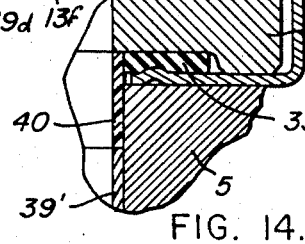
FIG. 13.  FIG. 15.  FIG. 16.  FIG. 14.
INVENTORS.
HENRY J. FRABONI
HAROLD C. MAPES
NEWELL D. MULLIN
ATTORNEY.

3,438,647
SEALING MEANS FOR KINGPIN THRUST
BEARING ASSEMBLIES
Henry J. Fraboni, Watkins Glen, Harold C. Mapes,
Elmira, and Newell D. Mullin, Pine City, N.Y.,
assignors to Trayer Products, Incorporated, Elmira,
N.Y., a corporation of New York
Filed June 30, 1967, Ser. No. 650,526
Int. Cl. B62d 7/06
U.S. Cl. 280—96.1
12 Claims

ABSTRACT OF THE DISCLOSURE

The invention comprises the provision of improved sealing means for excluding foreign matter from and confining lubricant in a thrust bearing assembly of an automotive vehicle front axle, kingpin and steering knuckle combination while permitting spent and contaminated lubricant to be extruded under pressure from within the bearing for replacement by fresh lubricant.

BACKGROUND OF THE INVENTION

Field of the invention

In front axle combinations difficulty has been encountered in providing durable and effective seals for the thrust bearing assemblies which support the axle from the steering knuckle while leaving the latter free to move about a substantially vertical axis to steer the vehicle and this invention is directed to improvements in sealing means for such assemblies.

Description of the prior art

The invention is of particularly useful application in thrust bearing assemblies of the general character of that disclosed in U.S. Letters Patent 3,300,230 granted Jan. 24, 1967, to Robert E. Spencer, Taylor, Mich., embodying sealing means intended for excluding foreign matter from the bearing surfaces in the assembly while presumably permitting passage of lubricant under pressure therethrough to enable spent lubricant and entrained contaminants to be purged from the bearing.

SUMMARY OF THE INVENTION

The invention is directed primarily to the utilization in a thrust bearing seal of a flat annular sealing ring made of an elastomeric composition resistant to the action of organic solvents disposed in a generally complementary groove or annular recess in a load carrying member of the bearing assembly and held in place therein by means projection from the adjacent casing member and penetrating into the sealing ring to maintain it locally under compression against the bottom of said groove, the radially innermost edge of said ring being proportioned to the diameter of the king pin or other element of the combination which it engages in such manner as to inhibit passage of lubricant and foreign matter axially therethrough during relative rotation of the principal load bearing elements of said thrust bearing, while improvements in the meeting zones of the casing members facilitate the flow of lubricant through the bearing, especially during servicing of the latter.

BRIEF DESCRIPTION OF THE DRAWINGS

In the drawings:

FIG. 1 is a fragmentary front elevation, partly in vertical section, of a vehicle axle, steering knuckle and kingpin combination with which is incorporated a preferred embodiment of the invention including a thrust bearing and sealing means therefor;

FIG. 2 on a larger scale is a diametral section of the thrust bearing and sealing ring and casing assembly apart from the axle, kingpin and knuckle combination;

FIG. 2a is a greatly enlarged fragmentary radial section of certain portions of the thrust bearing and associated parts;

FIG. 2b is a fragmentary section corresponding to a portion of FIG. 2 but showing a modified thrust bearing in which a lubricant seal for the lower race is omitted and a modified casing member allows said race to rest directly upon a steering knuckle part;

FIG. 2c is a fragmentary sectional view corresponding to FIG. 2b but illustrating another modification of the lower race;

FIG. 3 on a smaller scale is a face view of a casing member utilized in the thrust bearing of the preceding FIGS. 1 and 2 and since from this aspect except for possible minor dimensional differences the appearance of both upper and lower casing members is the same, FIG. 3 may be deemed as illustrative of both;

FIG. 4 on like scale is a similar view of a casing member of slightly different form;

FIG. 5 is a corresponding view on a smaller scale of a modified casing member which may be employed instead of either of those shown in the preceding figures;

FIG. 5a is an enlarged fragmentary section in the manner of FIG. 2a but showing the casing member of FIG. 5 in operative association with other components;

FIG. 6 is a face view corresponding to FIGS. 3, 4 and 5 on the scale of the last of another modification of which casing members may partake for purposes which will hereinafter appear;

FIG. 7 is a generally like view of still another modification of a casing member;

FIG. 7a is an enlarged view corresponding to FIGS. 2a and 5a but based on the casing member of FIG. 7;

FIG. 8 is an enlarged fragmentary detail in side elevation of the inner casing member utilized in the bearing more generally illustrated in FIGS. 1 and 2 showing preferred means providing access between the interior and exterior of said inner casing member within the outer one whereby lubricant pressure at this zone is equalized;

FIG. 8a is a fragmentary radial section on line 8a—8a in FIG. 8 showing said access means from another aspect;

FIG. 9 is a view corresponding to FIG. 8 but illustrating modified means for providing passage of the lubricant;

FIG. 9a is a radial section corresponding to FIG. 8a showing the modified access means of FIG. 9 and more particularly illustrating a control element utilized in conjunction therewith;

FIGS. 10 and 10a show a variation on the embodiment illustrated in FIGS. 9 and 9a in that a modified sealing element extends between coaxial portions of the casing elements;

FIG. 11 corresponding to FIGS. 8 and 9 illustrates another modification whereby migration of lubricant may be facilitated;

FIGS. 12 and 12a corresponding to FIGS. 8, 8a and FIGS. 9, 9a show another modification utilizing a "gate" formed in the metal of the inner casing member to control egress of lubricant from the interior;

FIG. 13 is an enlarged fragmentary radial section showing details of the preferred embodiment of the invention in the area of the lower seal of the thrust bearing;

FIG. 14 is a corresponding view of a bearing embodying in the said area a modification of the structure illustrated in FIG. 13;

FIG. 15 is a fragmentary section similar to FIG. 14 but on a smaller scale and illustrating modified construction of a sealing element associated with a lower bearing race, and FIG. 16 is a corresponding view of a further modification of the lower race sealing means.

DESCRIPTION OF THE PREFERRED EMBODIMENT

The preferred embodiment of the invention as illustrated in the drawing is adapted for utilization in an axle, kingpin and steering knuckle combination as disclosed in said Spencer Patent 3,300,230 and it will be unnecessary to recite herein the functions, character or operation of any of those elements, counterparts of which are represented by axle 1, kingpin 2 removably secured therein and steering knuckle 3 in the present drawings. The thrust bearing assembly 4 as contemplated by the invention is interposed between the axle 1 and the lower portion 5 of the steering knuckle, surrounding the kingpin and supporting the axle while leaving the knuckle free to rotate about the kingpin axis for steering the vehicle in which it is employed.

The thrust bearing assembly 4 comprises annular bearing elements 8, 9, hereinafter sometimes designated races, separated by and embracing an annular thrust element 10 preferably of a softer metal than the races, for example, bronze when the races are steel. Thrust element 10 has a series of four equally spaced radial V-grooves 11 in each of its opposite faces having divergent flat side walls defining an obtuse angle of approximately 150° and thus providing relatively broad shallow radially extending containers or conduits for lubricant supplied to the bearing.

The bearing is enclosed within casing members 12, 13 the upper or outer casing 12 having a peripheral channel shaped portion 14 receiving radial flange 15 of the lower casing 13 while at its upper flat radial surface 12' it has in the embodiment illustrated in FIGS. 1–3 an annular groove or indentation 16 whereby a rib 17 is formed projecting from its lower face and effective to retain in an annular groove 19 in the adjacent radial face of bearing element 8 an annular sealing ring 20 preferably made from organic-solvent-resistant elastomeric material with its inner edge defining an annular surface adapted to snugly engage a complementary cylindrical surface of kingpin 2 to form a seal therewith.

More specifically, where a kingpin 1.06" in diameter is employed, the inside diameter of bearing elements 8, 9 is preferably made slightly larger, for example 1.062"–1.072" but the sealing element 20 should then have a somewhat smaller inside diameter for example 1.03"–1.04" providing a light proof seal with a 1.0538" diameter plug gage and thus adapted to maintain a continuous yielding pressure radially inward when assembled with a 1.06" diameter kingpin.

These dimensions, given by way of example, serve only to illustrate the nature of the inward pressure desirably exerted by the elastomeric sealing ring 20 and are not to be taken as limiting the scope of the invention or the appended claims in any way.

Reference has thus far been made only to the upper sealing ring 20 held in place in groove 19 of upper bearing element 8 by means projecting from the upper casing member 12 but it will be readily understood that the corresponding region of lower bearing element 9 may be provided with generally comparable sealing means comprising sealing ring 20' disposed in groove 19' in the lower bearing element 9 and held in place therein by rib 17' formed from subjacent casing member 13.

Modifications of the structure in this region of the bearing are illustrated in FIGS. 2b and 2c embodied in bearings adapted for situations in which sealing means for the lower bearing element may be unnecessary. Thus, in FIG. 2b lower bearing element 9' rests directly on the adjacent lower portion 5 of the steering knuckle and a lower casing member is omitted, upper casing member 12' being extended axially to depend below the outer cylindrical surface of lower bearing element 9' and crimped inwardly to retain bearing elements 8', 9' in assembled relation embracing thrust washer 10', groove 19' in the lower bearing element being unnecessary except perhaps as a reservoir for lubricant, but employed in the interests of symmetry, enabling like elements to be used for upper and lower bearing parts.

In the bearing shown in FIG. 2c, groove 19" in lower bearing element 9" is considerably smaller radially than groove 19' just discussed, and a sleeve or bushing 21 disposed in lower steering knuckle portion 5 is extended above the upper face of the latter and into said groove forming a wholly metallic seal relatively somewhat less effective than those employing elastomeric sealing rings but nevertheless adequate for at least some situations.

As will be evident from the foregoing specific means other than rib 17 may be utilized for maintaining ring 20 in groove 19 and we have therefore illustrated and will now describe other means within the scope of the invention whereby this function can be accomplished. Thus in the outer casing 12a of FIG. 4 a groove 16a, and hence the corresponding rib as distinguished from groove 16 and rib 17 of FIGS. 2 and 3 is circumferentially discontinuous and partakes of the form of a plurality of circumferentially spaced concentric arcs or segments; being otherwise similar a section on line 2a—2a in FIG. 4 corresponds exactly to said FIG. 2a.

Another expedient for locking ring 20b in groove 19b is illustrated in FIGS. 5 and 5a wherein circumferentially spaced grooves 16b and corresponding ribs 17b extend radially of the outer casing member effectively to confine the ring in its groove in the thrust bearing race. Any suitable number of these radial grooves may be employed, and the selection of eight as a convenient number is but a matter of choice.

Still another modification in this area of the bearing, illustrated in FIG. 6 contemplates utilizing a circumferentially spaced series of "punch marks" or dimples 16c, forming corresponding projections on the inner face of outer casing 12c for holding the ring 20c in its groove. As a section on line 2a—2a in FIG. 6 would be substantially identical with FIG. 2a it may be assumed the latter is illustrative as well of this modification.

Finally, as yet other means for confining the sealing ring in its groove, the inner edge of the upper annulus of the outer casing 12d may be crimped as at 16d in FIG. 7 and 7a to provide a substantially continuous annular projection 17d penetrating the sealing ring 20d and confining it in groove 19d.

While these several means for insuring assembly of the sealing ring, bearing member and outer casing may be employed substantially interchangeably, and as will hereinafter more fully appear substantially similar means may be utilized for positioning a lower sealing ring in operative relation to the lower bearing race 9 we do not exclude the possibility still other specific means for accomplishing this result may be devised within the contemplation of the invention.

Coming now to the means whereby access of the lubricant to the space between the inner and outer casings and to the exterior of the outer one from within the inner one is afforded it may here be noted that when the upper and lower casing members 50, 52 of said Spencer patent are properly proportioned to exclude foreign matter and prevent contamination of the lubricant within the bearing freedom of relative rotation of the bearing components is frequently compromised and in such bearings further difficulties in servicing have appeared due perhaps to a tendency of the lower casing member to expand slightly when pressure is exerted against the lubricant in the bearing during attempts to inject additional lubricant thereinto. Thus instead of permitting spent or contaminated lubricant to be purged or forced from the bearing the closeness of the fit initially required, possibly compounded by expansion of the lower casing member, presents purging of the bearing by injection of fresh lubricant thereinto under pressure thereby incurring risk that the bearing may be kept in service for long periods without adequate lubrication and hence suffer permanent damage.

In accordance with our invention any one of several expedients may be selectively employed for allowing egress of lubricant from within the bearing without exposing the latter to undue contamination or risk of entry into the bearing surface area of foreign matter and we have illustrated in FIG. 8 to 12a inclusive several embodiments of such means without prejudice to the availability or utilization of other and equivalent means for accomplishing like functions.

Thus in FIGS. 8 and 8a there is illustrated in greater detail than in the preceding figures means comprising a simple notch 25 typical of a series of like notches, circumferentially spaced, preferably at uniform intervals of about 45°, in the radial flange 15 of lower casing 13 and extending a short distance axially in the cylindrical body of the casing. These notches permit equalization of lubricant pressure between the interior of lower casing 13 and the lower portion of channel shaped portion 14 of upper casing 12 below the area of closest proximity and hence minimum clearance of the flange edge with relation to the interior wall of the channel shaped portion 14.

Consequently, even when this minimum clearance is so small, as it often is, as to substantially inhibit egress of lubricant from the bearing under pressure exerted by a lubricant injecting tool, particularly when such pressure tends to expand the lower casing and still further reduce the clearance, the notches remain open and hence relatively unobstructed, enabling the bearing to be purged and contaminated lubricant to be extruded therefrom, the clearance between the inner edge of skirt 26 of channel shaped portion 14 and the adjacent lower casing 13 normally being adequate for this purpose.

As an alternative to notches 25 terminating short of the plane of skirt 26, it is contemplated by the invention that a like series of even deeper notches 27 (FIGS. 9, 9a) may be utilized if desired, extending axially beyond the skirt 26a in lower casing 13a, in which case an elastic band 28, preferably of organic grease-and-solvent-resistant polymer such as neoprene or the like is desirably applied about the lower casing with its upper edge 29 engaging skirt 26a on upper casing 12a to exclude contaminants while yieldingly permitting extrusion of lubricant from the interior of the bearing.

As an intermediate modification based in part on that just discussed, in the structure shown in FIGS. 10 and 10a notches 27' extend axially in lower casing member 13b a distance less than notches 27 (FIGS. 9, 9a) but farther than notches 25 (FIGS. 8, 8a) and an elastic band 28' having a bead 29' at its upper edge surrounds lower casing member 13b while upper casing member 12b is modified to provide a skirt 26b surrounding band 28' just below bead 29' to afford an elastic seal between the upper and lower casing members.

Another expedient providing means for passage of lubricant past the edge of lower casing 13c and its radial flange 15c may comprise (FIG. 11) merely a series of circumferentially spaced slits 30 in the flange and adjacent portion of the casing, these slits being spaced preferably at circumferential intervals of about 45° and terminating short of the plane of skirt 26c presented by upper casing 12c.

Yet another means for allowing escape of lubricant from within the bearing while preserving the protection from contamination afforded by the casing members is illustrated in FIGS. 12, 12a comprising arcuate or substantially crescent shaped gates 31 in the side wall of lower casing 13d having the effect of miniature check valves punched in the sides of the lower casing with their free edges 32 displaced outwardly about the thickness of the material in which they are formed so as to yield slightly under internal pressure to allow extrusion of lubricant through the ports they respectively control, and into the space confined by skirt 26d of upper casing 12d. As in the case of the notches in FIGS. 8–10 and the slits in FIG. 11 the number of these gates 31 employed is a matter of choice, although eight of them preferably spaced at 45° intervals will usually be found adequate.

As additional modifications in the structure utilized for the lower seal in the bearing where relative motion of adjacent components is somewhat differently developed from that in the upper seal we deem acceptable for use in conjunction with any of the specific upper seals and casing components any of those illustrated in FIGS. 13–16 inclusive as will now more fully appear.

Thus whereas in the upper seal sealing ring 20 and kingpin 2 are fixed with relation to each other as well as with relation to axle 1, upper bearing casing 12 and upper bearing race 8, the lower bearing seal may be fixed with relation to the steering knuckle part 5, lower bearing casing 13 and lower bearing race 9 but must be capable of rotative movement with these components relative to kingpin 2 and about the axis of the latter. Hence a ring 35 dimensioned substantially similarly to ring 20 and made of like material is seated in a groove 36 in lower bearing race 37 and held therein by any appropriate means forming part of a lower casing member 13e, one of those illustrated in FIGS. 2 and 3 or FIGS. 4–7a inclusive usually being preferred. The inner diameter of ring 35, however, instead of being dimensioned to correspond to the diameter of the kingpin is of a size to embrace in a like manner an upward extremity 38 of lower bushing 39 of the assembly, said bushing for this reason being made somewhat longer in relation to the other parts than lower bushing 38 in the structure shown and described in said Spencer patent and hence extending within groove 36 in the lower bearing race to just short of contact with the bottom of that groove, as shown in FIG. 13.

An alternative to the above described lower seal for the bearing exemplified by FIG. 14 comprises a short lower bushing 39' substantially as in said Spencer patent, with a superposed separate, preferably plastic ring 40 aligned with it and engaged by an elastomeric sealing ring 35' corresponding to ring 35 in FIG. 13, ring 40 usually being fixed with relation to bushing 39' steering knuckle part 5, sealing ring 35' and lower bearing race 37' but capable of movement with these components about the axis of and relatively to kingpin 2.

As a modification of the structure just described we may utilize as lower race sealing means in place of sealing ring 35' and plastic ring 40 an integral elastomeric or other suitable combination ring 41 having a cylindrical portion 42 entering steering knuckle part 5 in prolongation of bushing 39d and a radial flange portion 43 entered in groove 19d in lower bearing race 9d, held in place by appropriate means integral with lower casing part 13f.

On the other hand, as illustrated in FIG. 16, bushing 39e may be extended to enter groove 19e in lower bearing element 9e and a sealing ring 35" surrounding its end entered in the same groove and with said lower bearing element allowed to rest directly on steering knuckle part 5, the lower casing member, as in the structure illustrated in FIG. 2c, being here also omitted and casing member 12e extended and crimped at its lower edge to maintain assembly of the bearing elements and thrust washer.

While we have herein shown and described certain embodiments of our invention, specifically including various modifications of certain components we believe appropriate for incorporation therein and have indicated that their selection is largely a matter of choice it will be understood that many factors may influence the exercise of that choice including manufacturing considerations, the preferences of customers, the availability of suitable materials and the like.

We claim:

1. A vehicle front axle thrust bearing assembly adapted for combination with an axle, a kingpin and a steering knuckle, said bearing assembly comprising upper and lower bearing races and an annular thrust bearing element interposed between them in coaxial relation thereto, upper and lower casing members surrounding and substantially enclosing the races and said thrust element, said upper casing member having a radially extending flat portion and integral therewith a substantially cylindrical portion surrounding and radially outwardly spaced from the upper race and terminating in a radially inwardly directed portion, said lower casing member having a substantially flat portion and integral therewith a substantially cylindrical portion extending into the substantially cylindrical portion of the upper casing member and terminating therein in a radially outwardly extending flange, at least one of said races having a groove underlying the inner edge of the flat portion of the adjacent casing member, an annular yieldable sealing ring disposed in said groove and extending radially inwardly beyond the inner edge thereof and means integral with said flat portion of said casing member projecting into said ring for retaining said ring in said groove.

2. A vehicle front axle bearing assembly as defined in claim 1 in which said ring retaining means comprise an annular rib integral with the said casing member coaxial with the inner edge of said substantially flat portion thereof and extending into said ring.

3. A vehicle front axle bearing assembly as defined in claim 1 in which said ring retaining means comprise a plurality of circumferentially spaced arcuate ribs integral with the substantially flat portion of the said casing member and coaxial with the inner edge thereof.

4. A vehicle front axle bearing assembly as defined in claim 1 in which said ring retaining means comprise a plurality of circumferentially spaced radially extending ribs projecting from said substantially flat portion of the adjacent casing member into said ring, said ribs being disposed at substantially equal distances from the inner edge of said substantially flat portion.

5. A vehicle front axle bearing assembly as defined in claim 1 in which said ring retaining means comprise a plurality of circumferentially spaced substantially conical projections integral with said flat portion of said casing member and projecting therefrom into said ring at substantially uniformly spaced intervals circumferentially of said flat portion and substantially equally spaced from the inner edge thereof.

6. A vehicle front axle bearing assembly as defined in claim 1 in which said ring retaining means comprise an annular axially projecting portion integral with said substantially flat portion of said casing member and extending at the inner edge thereof into said ring.

7. In a vehicle front axle thrust bearing assembly adapted for combination with an axle, a steering knuckle, a kingpin received in the axle and extending within bores in the steering knuckle and bushings in said bores surrounding the kingpin, said bearing assembly surrounding the king pin between the axle and a portion of the steering knuckle and comprising substantially annular bearing parts each having an annular flat outer surface paralleling the flat outer surface of the other bearing part, a thrust receiving element interposed between said parts, a casing for said bearing assembly comprising upper and lower complementary casing members, the upper casing member having a substantially flat portion extending normal to the axis of the king pin and a depending substantially cylindrical portion integral therewith, said cylindrical portion terminating in an inwardly directed portion and said lower casing member having a substantially flat portion paralleling the flat portion of the upper casing member and cooperative therewith to embrace said annular bearing parts and said thrust receiving element, said lower casing member having an upstanding integral cylindrical portion extending into the said cylindrical portion of the upper casing member and terminating therein in a radially outwardly extending annular flange, each of said bearing parts providing an annular groove in its flat surface adjacent its axis, a substantially flat annular sealing ring disposed in at least one of said grooves, means constituting an integral part of the substantially flat portion of the adjacent casing member extending into said sealing ring and means in the cylindrical portion of said lower casing member providing spaced passages for lubricant from within said lower casing member to the annular space between the flange on said lower casing member and inwardly directed portion of the upper casing member.

8. A vehicle front axle bearing assembly as defined in claim 7 in which said flange has a plurality of circumferentially spaced notches therein extending into the cylindrical portion of said lower casing member and defining said spaced passages.

9. A vehicle front axle bearing assembly as defined in claim 7 in which said flange has a plurality of circumferentially spaced notches therein extending into the cylindrical portion of said lower casing member and axially beyond the plane of the inwardly directed portion of said upper casing member and an elastomeric band surrounding the lower casing member overlying said notches and engaging said inwardly directed portion of the upper casing member.

10. A vehicle front axle bearing assembly as defined in claim 7 in which said flange has a plurality of circumferentially spaced slits extending into the substantially cylindrical portion of the lower casing member.

11. A vehicle front axle bearing assembly as defined in claim 7 in which said lower casing member has a plurality of circumferentially spaced arcuate outwardly displaced gates integral with said cylindrical portion of said lower casing member defining passages through complementary ports respectively controlled thereby communicating with the interior of the substantially cylindrical portion of the upper casing member exteriorly of the lower casing member.

12. A vehicle front axle thrust bearing assembly adapted for combination with an axle, a kingpin and a steering knuckle, said bearing assembly comprising upper and lower bearing races and an annular thrust bearing element interposed between them in coaxial relation thereto, casing means surrounding and substantially enclosing the races and said thrust element having a radially extending flat portion and integral therewith a substantially cylindrical portion surrounding and radially outwardly spaced from the upper race and terminating in a radially inwardly directed portion, at least one of said races having a groove underlying the inner edge of the flat portion of the casing means, an annular yieldable sealing ring disposed in said groove and extending radially inwardly beyond the inner edge thereof, and means integral with said flat portion of said casing means projecting into said ring for retaining said ring in said groove.

References Cited
UNITED STATES PATENTS

| | | | |
|---|---|---|---|
| 2,689,756 | 9/1954 | Carlson | 287—93 |
| 3,133,743 | 5/1964 | Mullin | 280—95 |
| 3,300,230 | 1/1967 | Spencer | 280—96.1 |
| 3,342,507 | 9/1967 | Koch et al. | 308—120 |

KENNETH H. BETTS, *Primary Examiner.*

U.S. Cl. X.R.

308—36.1, 120